United States Patent
Zirwas et al.

(10) Patent No.: US 11,196,522 B2
(45) Date of Patent: Dec. 7, 2021

(54) ENHANCED SOUNDING REFERENCE SIGNAL SCHEME

(71) Applicant: Nokia Technologies Oy, Espoo (FI)

(72) Inventors: Wolfgang Zirwas, Munich (DE); Mihai Enescu, Espoo (FI); Frederick Vook, Schaumburg, IL (US); William Hillery, Lafayette, IN (US); Eugene Visotsky, Buffalo Grove, IL (US)

(73) Assignee: Nokia Technologies Oy, Espoo (FI)

( * ) Notice: Subject to any disclaimer, the term of this patent is extended or adjusted under 35 U.S.C. 154(b) by 209 days.

(21) Appl. No.: 16/577,376

(22) Filed: Sep. 20, 2019

(65) Prior Publication Data

US 2020/0106583 A1    Apr. 2, 2020

Related U.S. Application Data

(60) Provisional application No. 62/738,086, filed on Sep. 28, 2018.

(51) Int. Cl.
*H04L 5/00* (2006.01)
*H04B 7/06* (2006.01)
*H04W 72/04* (2009.01)

(52) U.S. Cl.
CPC ......... *H04L 5/0048* (2013.01); *H04B 7/0626* (2013.01); *H04W 72/046* (2013.01)

(58) Field of Classification Search
CPC ..... H04L 5/0048; H04L 27/18; H04L 5/0044; H04L 5/0051; H04L 5/0023; H04L 5/0082; H04L 5/10; H04L 1/0061; H04L 27/2613; H04L 5/0053; H04L 25/0226; H04L 5/0083; H04L 1/00; H04L 5/0012; H04L 27/2607; H04L 5/00; H04L 27/26132; H04L 5/001; H04L 27/2605; H04L 1/08; H04L 5/0091; H04L 25/0224; H04L 5/0064; H04L 5/0094; H04L 5/0007; H04L 5/0073; H04L 27/2655; H04L 5/0057; H04L 5/0096; H04L 1/1896; H04L 1/1816; H04L 1/189; H04L 5/0055; H04L 1/0079; H04B 7/0626; H04B 1/7143; H04B 7/0617; H04B 1/713; H04B 7/0695; H04B 7/088; H04W 72/046; H04W 72/04; H04W 56/001; H04W 76/11; H04W 72/0446; H04W 76/27; H04W 88/02; H04W 72/0453; H04W 72/042; H04W 72/044; H04W 16/28; H04W 88/08; H04W 28/04;
(Continued)

(56) References Cited

U.S. PATENT DOCUMENTS

2011/0141982 A1* 6/2011 Zhang ................ H04L 27/2613
370/329
2017/0273042 A1* 9/2017 Shilov ................ H04W 56/002
(Continued)

*Primary Examiner* — Hardikkumar D Patel
(74) *Attorney, Agent, or Firm* — Harrington & Smith

(57) ABSTRACT

An example of an embodiment is a method including: allocating, by a network node, an uplink non-orthogonal reference signal sequence to each of a plurality of user equipments within a cooperation area; receiving, from at least one user equipment of the plurality of user equipments, the uplink non-orthogonal reference signal allocated to the at least one user equipment; and determining channel state information for the at least one user equipment based on the received uplink non-orthogonal reference signal.

18 Claims, 8 Drawing Sheets

(58) Field of Classification Search
CPC ........... H04W 74/006; H04W 72/1289; H04W 72/14; H04W 72/1268; H04W 72/0486; H04J 13/0029; H04J 11/0069; H04J 11/00
See application file for complete search history.

(56) References Cited

U.S. PATENT DOCUMENTS

| | | | |
|---|---|---|---|
| 2018/0199359 A1* | 7/2018 | Cao | H04W 72/1268 |
| 2019/0058558 A1* | 2/2019 | Lee | H04L 5/0007 |
| 2020/0204238 A1* | 6/2020 | Na | H04W 72/04 |

* cited by examiner

ENHANCED SOUNDING REFERENCE SIGNAL SCHEME

CROSS REFERENCE TO RELATED APPLICATION

This application claims priority under 35 USC 119(e) to U.S. provisional patent application No. 62/738,086 filed Sep. 28, 2018, which is hereby incorporated by reference in its entirety.

TECHNICAL FIELD

Various embodiments relate generally to wireless networks and, more specifically, relate to sounding reference signals in wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

In wireless networks, such as long term evolution (LTE) wireless networks for example, a sounding reference signal (SRS) is a reference signal transmitted by a user equipment to a base station. The base station uses the SRS to estimate, for example, the channel quality at different frequencies.

BRIEF SUMMARY

This section is intended to include examples and is not intended to be limiting.

In an example of an embodiment, a method is disclosed that includes allocating, by a network node, an uplink non-orthogonal reference signal sequence to each of a plurality of user equipments within a cooperation area; receiving, from at least one user equipment of the plurality of user equipments, the uplink non-orthogonal reference signal allocated to the at least one user equipment; and determining channel state information for the at least one user equipment based on the received uplink non-orthogonal reference signal.

An example of an apparatus includes one or more processors and one or more memories including computer program code. The one or more memories and the computer program code are configured to, with the one or more processors, cause the apparatus to perform at least the following: allocating, by a network node, an uplink non-orthogonal reference signal sequence to each of a plurality of user equipments within a cooperation area; receiving, from at least one user equipment of the plurality of user equipments, the uplink non-orthogonal reference signal allocated to the at least one user equipment; and determining channel state information for the at least one user equipment based on the received uplink non-orthogonal reference signal.

In an example of an embodiment, a computer readable medium is provided including program instructions for causing an apparatus to perform at least the following: allocating, by a network node, an uplink non-orthogonal reference signal sequence to each of a plurality of user equipments within a cooperation area; receiving, from at least one user equipment of the plurality of user equipments, the uplink non-orthogonal reference signal allocated to the at least one user equipment; and determining channel state information for the at least one user equipment based on the received uplink non-orthogonal reference signal.

DETAILED DESCRIPTION OF THE DRAWINGS

Figure 1:
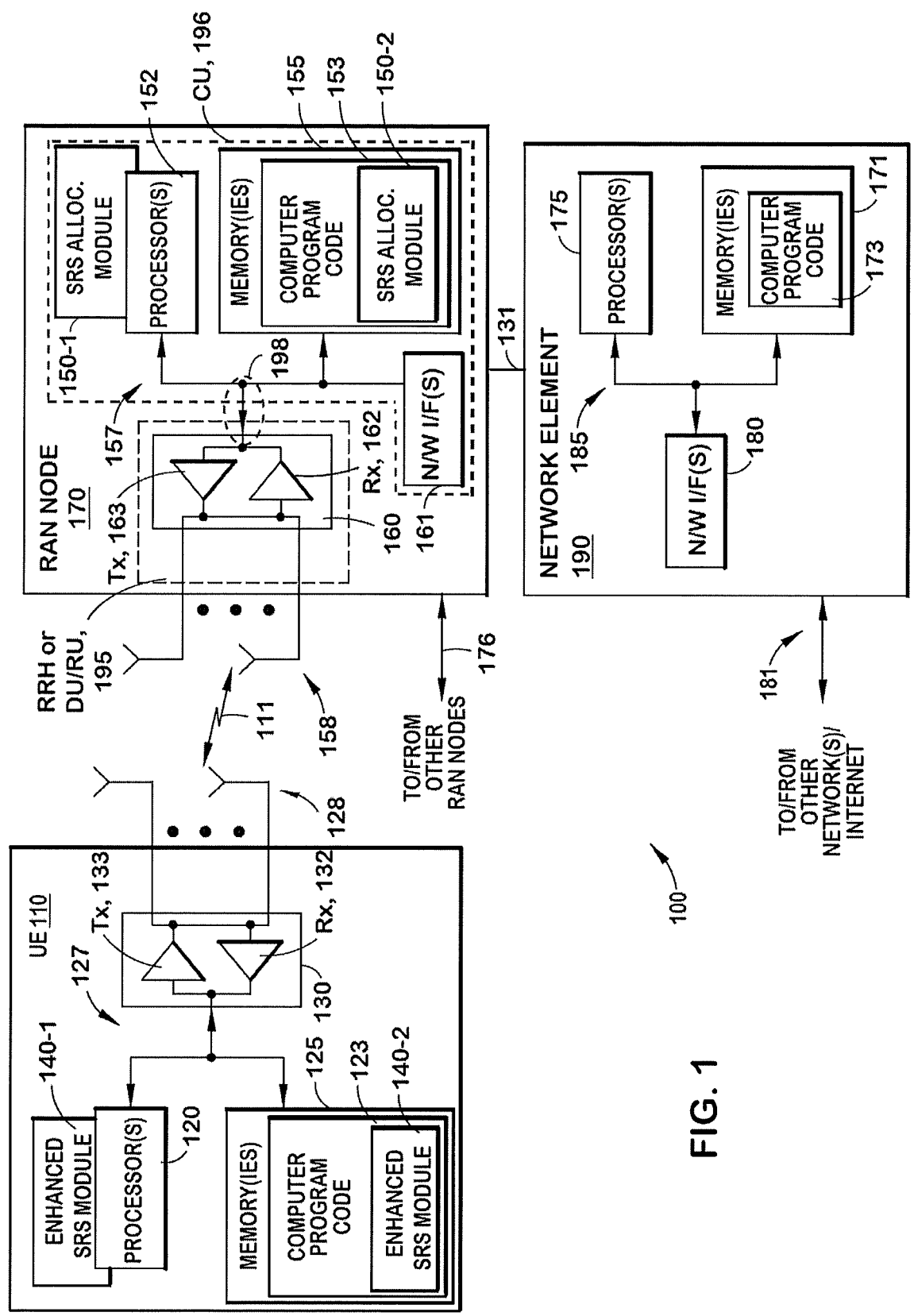
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
5GC 5G core network
AMF access and mobility management function
AoA angle of arrival
CIR channel impulse response h(t,tau) time-domain representation of the channel
CSI channel state information
CU central unit
DL downlink
DU distributed unit
eNB (or eNodeB) evolved Node B (e.g., an LTE base station)
EN-DC E-UTRA-NR dual connectivity
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC GoB grid of beam
GW gateway (IoT base-station)
I/F interface
LPWAN low power wide area network
LTE long term evolution
MAC medium access control
MME mobility management entity
N/W or NW network
NE network element
ng or NG new generation
ng-eNB new generation eNB
NR new radio
PDCP packet data convergence protocol
PHY physical layer
PNL power normalization loss
RAN radio access network
Rel release
RLC radio link control
RRC radio resource control
RRH remote radio head
RU radio unit
Rx receiver
SDAP service data adaptation protocol
SGW serving gateway
SMF session management function
TDD time division duplex
TDoA time difference of arrival
TS technical specification
Tx transmitter
UE user equipment (e.g., a wireless, typically mobile device)
UL uplink
UPF user plane function The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for an enhanced sounding reference signal scheme. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) node 170, and network control element(s) (NCE(s)) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes an enhanced SRS module, comprising one of or both parts 140-1 and/or 140-2, which may be implemented in a number of ways. The enhanced SRS module may be implemented in hardware as enhanced SRS module 140-1, such as being implemented as part of the one or more processors 120. The enhanced SRS module 140-1 may be implemented also as an integrated circuit or through other hardware such as a programmable gate array. In another example, the enhanced SRS module may be implemented as enhanced SRS module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the NE(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes an SRS allocation (alloc.) module, comprising one of or both parts 150-1 and/or 150-2, which may be implemented in a number of ways. The SRS allocation module may be implemented in hardware as SRS allocation module 150-1, such as being implemented as part of the one or more processors 152. The SRS allocation module 150-1 may be implemented also as an integrated circuit or through other hardware such as a programmable gate array. In another example, the SRS allocation module may be implemented as SRS allocation module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the SRS allocation module may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 195 also indicates those suitable network links(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120-degree cells per carrier and two carriers, then the base station has a total of 6 cells.

The wireless network 100 may include a network element (NE) (or elements, NE(s)) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NE(s) 190, and note that both 5G and LTE functions might be supported. The RAN node 170 is coupled via a link 131 to the NE 190. The link 131 may be implemented as, e.g., an NG interface for 5G, or an S1 interface for LTE, or other suitable interface for other standards. The NE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

Figure 2:
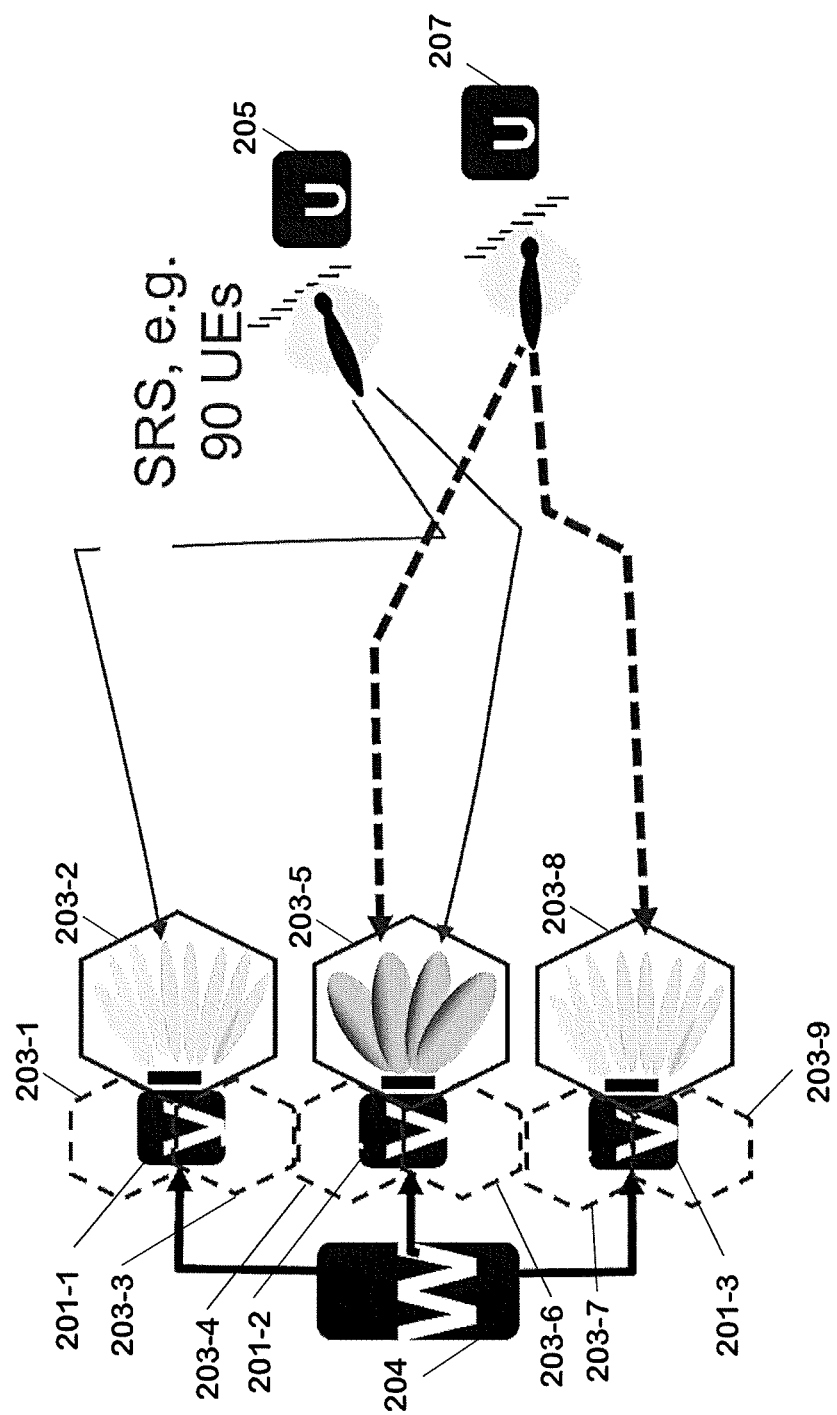
FIG. 2 shows an example of a JR CoMP scenario in accordance with exemplary embodiments.

In NR Release 15 a flexible concept has been standardized for the uplink (UL) sounding reference signals (SRS). However, this concept mainly supports single cell scenarios and is not intended for multi TRP (transmission point) cases, where, for example, reciprocity-based joint transmission (JT) or reception (JR) CoMP is applied over multiple sites and cells. FIG. 2 shows an example of a typical JR CoMP scenario over three sites (i.e. 201-1, 201-2, 201-3) or nine cells (i.e. cells 203-1 to 203-9) together with massive MIMO and a fixed GoB concept. In this example, TDD is being assumed so that the downlink (DL) JT CoMP precoder may be calculated based on the channel estimation from the UL SRS reference signal transmissions sent from UEs 205, 207.

In the example shown in FIG. 2, cells 203-1 to 203-3 belong to the site 201-1, cells 203-4 to 203-6 belong to site 201-2, and cells 203-7 to 203-9 belong to the site 201-3. Each cell include a fixed GoB precoder matrix, V, which forms a number of beams from a number of antenna elements (such as forming 32 beams from 1024 antenna elements for example). Precoder 204 represents, for example, a ZF precoder over all three sites or all nine cells.

Due to the TX- and Rx beamformers the overall channel matrix will be sparse, namely, each beam receives only a limited number of SRS from currently active UEs (i.e. UEs that might be scheduled in one of the next TTIs for example), while many UEs will be received below a certain power threshold.

The current NR SRS signals are capable of providing only coarse CSI information, which is particularly insufficient for frequency selective CSI estimation for accurate precoding. In addition, the UL faces the classical pilot contamination challenge, i.e., either a high overhead is needed to orthogonalize the SRS signals, such as by using a high frequency reuse factor for the SRS signals for example and/or the CSI estimation quality will be low.

Thus, there is a need to extend the given SRS NR Release 15 framework so that it enables accurate and frequency selective CSI estimates based on channel reciprocity in the UL in combination with a low to moderate SRS overhead.

For DL, a related problem has been solved by the so called Coded CSI RS concept, which relies on specifically designed non-orthogonal CSI RS sequences instead of the classical orthogonal NR Release 15 CSI RSs. Note, for Release 15 the orthogonality is being achieved either in time, frequency, or code domain.

In DL, the UEs receive a limited set of relevant channel components $N_{UE}$ out of the overall set of possible beams or channel components. With Coded CSI reference signals, each UE can reconstruct its UE specific set of $N_{UE}$ relevant beams based on non-orthogonal Vandermonde like sequences of length $N_{seq} > N_{UE}$. In typical scenarios, $N_{UB} \ll N_{all}$, where $N_{all}$ is the overall number of beams forming, for example, the cooperation area so that there is a significant savings in reference signal overhead.

There are some important differences for UL as compared to DL, such as:
  In DL one can pre-configure the non-orthogonal sequences to antenna ports (AP) and then either fix this allocation or semi statically adapt it, such as by RRC messages for example. In UL the co-scheduled UEs will vary over time and frequency and therefore non orthogonal sequence IDs need to be allocated to UE IDs in an efficient manner.
  For DL, non-orthogonal CSI RS sequences are transmitted from each Tx-beam (AP) using the same sequence length $N_{seq}$ as the beams have to serve all UEs simultaneously. For UL, there are cell edge and cell center UEs with different Rx-power at the gNB Rx-beams and with different channel conditions with respect to the number of gNB Rx-beams being affected by a certain UE.
  UL SRS signals are also designed quite differently as compared to the DL CSI RS reference signals. NR Release 15 defines for the DL orthogonal CSI RS, where the orthogonality is being achieved in time-, frequency, and/or code domain and this is being done per PRB. That way a frequency selective channel estimation is possible in DL, which is important such as for accurate MU MIMO or JT CoMP transmission in frequency selective radio channels for example. In UL, SRSs are certain Zadoff Chu (ZC) sequences, running over a certain frequency subband and the orthogonality between different UEs is achieved between the ZC sequences such as by cyclic shifts for example. This provides wideband orthogonality between UEs but does not allow for frequency selective CSI estimation in the UL.
  As such, the ZC SRS signals from NR Release 15 cannot easily be combined with non-orthogonal Coded CSI RS sequences.
  It is also noted that non-orthogonal coded CSI sequences are quite different from ZC sequences. For example:
    the non-orthogonal coded CSI sequences have a Vandermonde like design to enable reconstruction of any combination of received UE sequences, as long as the number of received sequences is below a certain maximum number of UEs, and
    in the sense that the non-orthogonal coded CSI sequences are repeated per PRB (or small subbands) so that a frequency selective channel estimation is possible.

Various example embodiments described herein allow for frequency selective channel estimation based on enhanced UL reference signals, which have only a moderate overall overhead and power consumption.

According to some example embodiments, each UE being served from a cooperation area are allocated a new non-orthogonal SRS sequence in addition to an orthogonal SRS sequence (such as an NR Release 15 SRS sequence for example). A 'cooperation area' is defined by the cooperating cells and/or beams and/or transmission points that use a common precoder for all simultaneously served UEs of the cooperation area. A length of the non-orthogonal SRS sequences may be adapted depending on the channel characteristics. For example, the length may be adapted differently for cell edge user equipment and center user equipments. These and other embodiments are discussed in more detail below.

Figure 3:
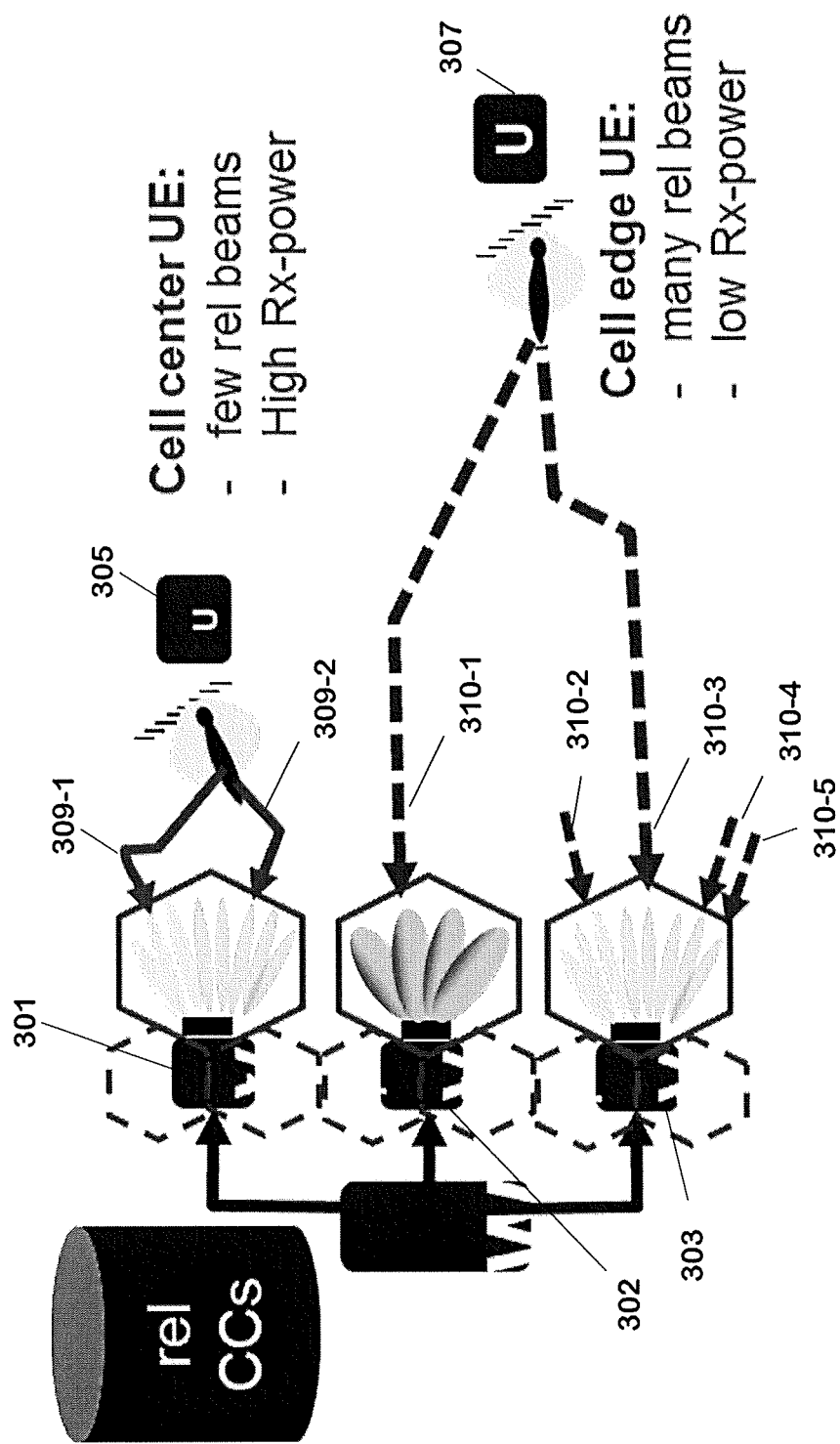
FIG. 3 shows an example of scenario with a cell center UE and a cell edge UE in accordance with exemplary embodiments.

Referring to FIG. 3, this figure shows a cell center UE 305 and a cell edge UE 307 in accordance with some example embodiments. Typically, a cell center UE is received only by a limited number of Rx-beams at the gNB, pre-dominantly from a single site (e.g. transmission point), while cell edge UEs will be received with lower Rx-power and will excite a higher number of Rx-beams and also beams from different cells and sites. In the example shown in FIG. 3 a cell center UE 305 is received by fewer relative Rx-beams (i.e. beams 309-1, 309-9 from site 301, whereas cell edge UE 307 is received by more relative Rx-beams (i.e. beams 310-1 to 310-5) from sites 302, 303. As the number of decodable non-orthogonal sequences per beam depends on the sequence length, longer non-orthogonal SRS sequences may be allocated to cell edge UEs as compared to that of cell center UEs.

There may be quite a bit of variation of received UE signals for different beams due to the number of active UEs and the channel conditions for these UEs. For the purposes of some embodiments, it is assumed that the gNB knows relevant channel components or beams per UE based on semi-static measurements or reporting of RSRP values. In this way, the gNB may know in advance the number of relevant UEs for a scheduled user group, which will be received on each of the beams. In these situations, the sequence length may be adapted per active UE group, such as on TTI basis and per PRB or frequency subband for example, so that it enables accurate CSI estimation even for the beam with the highest number of received UE signals.

Figure 4:
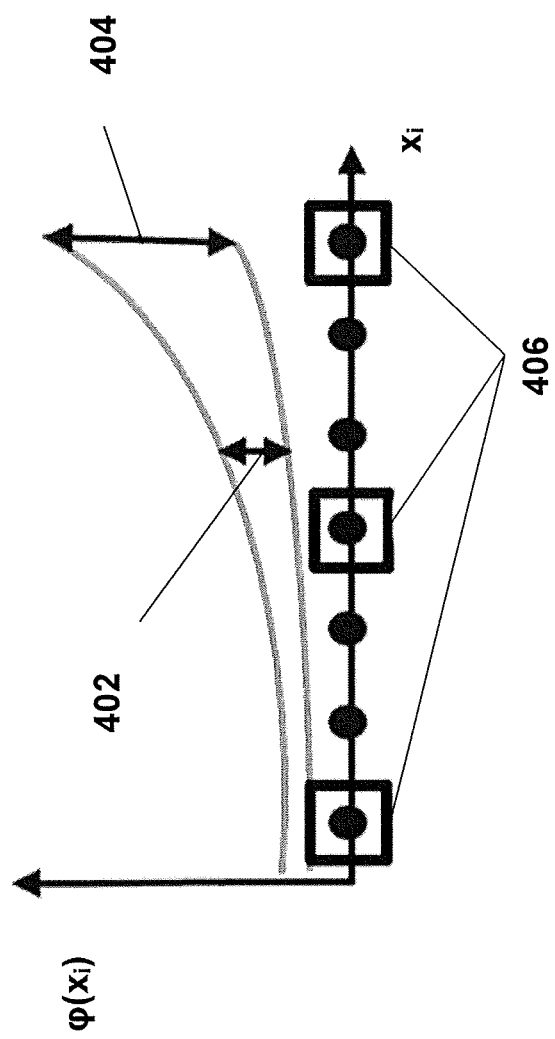
FIG. 4 shows an example adapting non-orthogonal SRS sequence length via subsampling in accordance with exemplary embodiments.

The non-orthogonal SRS sequence length can be adapted in different ways such as via subsampling and/or truncation for example. FIG. 4 shows an example adapting non-orthogonal SRS sequence length via subsampling in accordance with exemplary embodiments. More specifically, FIG. 4 shows that phase variation $\varphi(x_i)$ for non-orthogonal SRS sequences may increase exponentially over the sequence index, $x_i$ as represented by 402, 404. According to some example embodiments, the non-orthogonal SRS sequences for cell center UEs may be shortened by subsampling, as opposed to truncation for example. As mentioned previously, the cell center and cell edge UEs may be determined, for example, based on semi static RSRP measurements. For example, cell center UEs may have relevant beams only from one cell or site; whereas cell edge UEs may be connected to multiple cell or sites. In the example shown in FIG. 4, the subsampling shortens the sequence to the three elements corresponding to boxes 406. By shortening the length of the full non-orthogonal SRS sequence a maximum inter sequence distance can be maintained, thus maximizing the CSI estimation performance.

In other example embodiments, a sequence length per UE may be reduced by sequence truncation so that all cell edge UE sequences will generate a channel block submatrix with a fewer number of columns as compared to cell center UEs. This allows for a specific preprocessing of the sub block matrix.

One issue for coded CSI signals is inter code or inter sequence crosstalk when radio channels are not fully flat within the sequence length. A fully flat radio means a flat fading radio channel where all resource elements have the same channel transfer function value. For a frequency selective radio channel there are variations so that there will be code crosstalk. Therefore, it is important to consider the best allocation of elements of the non-orthogonal SRS sequence to resource elements.

According to some example embodiments, the last elements of the non-orthogonal SRS sequences are allocated at resources elements as close as possible in time and frequency to minimize crosstalk errors, while the elements at the beginning of the non-orthogonal SRS sequences (which generally have small relative phase variations) are placed at resource elements that are farther away in time and frequency. In some other embodiments, the first sequence elements may be allocated close to each other for better code crosstalk.

Which techniques are used to reduce the SRS sequence length and to reduce inter code interference generally depends on the underlying Vandermonde matrix defining the non-orthogonal sequences. Based on simulation, a truncation of non-orthogonal sequences generally works better and provides a lower condition number for the related coding matrix As noted above, NR Release 15 already specifies SRS based on Zadoff Chu (ZC) sequences, however the question remains on how to combine ZC and non-orthogonal coded CSI SRS in the best possible way. One option is to keep both reference signals fully orthogonal to each other due to their different characteristics, however, this tends to result in higher overhead.

Another option is to use the non-orthogonal coded SRS reference signals as a cell specific extension to the ZC sequences. As an example, the same wideband ZC sequences may be used for UEs in adjacent cells and one cell specific non-orthogonal SRS sequence extension may be added to each UE. For this option, the gNB can make a wideband CSI estimation with improved accuracy due to the reduced inter cell interference of the combined SRS signals. The gNB can then reconstruct UE specific CSI information at each beam of the cooperation area.

Figure 5:
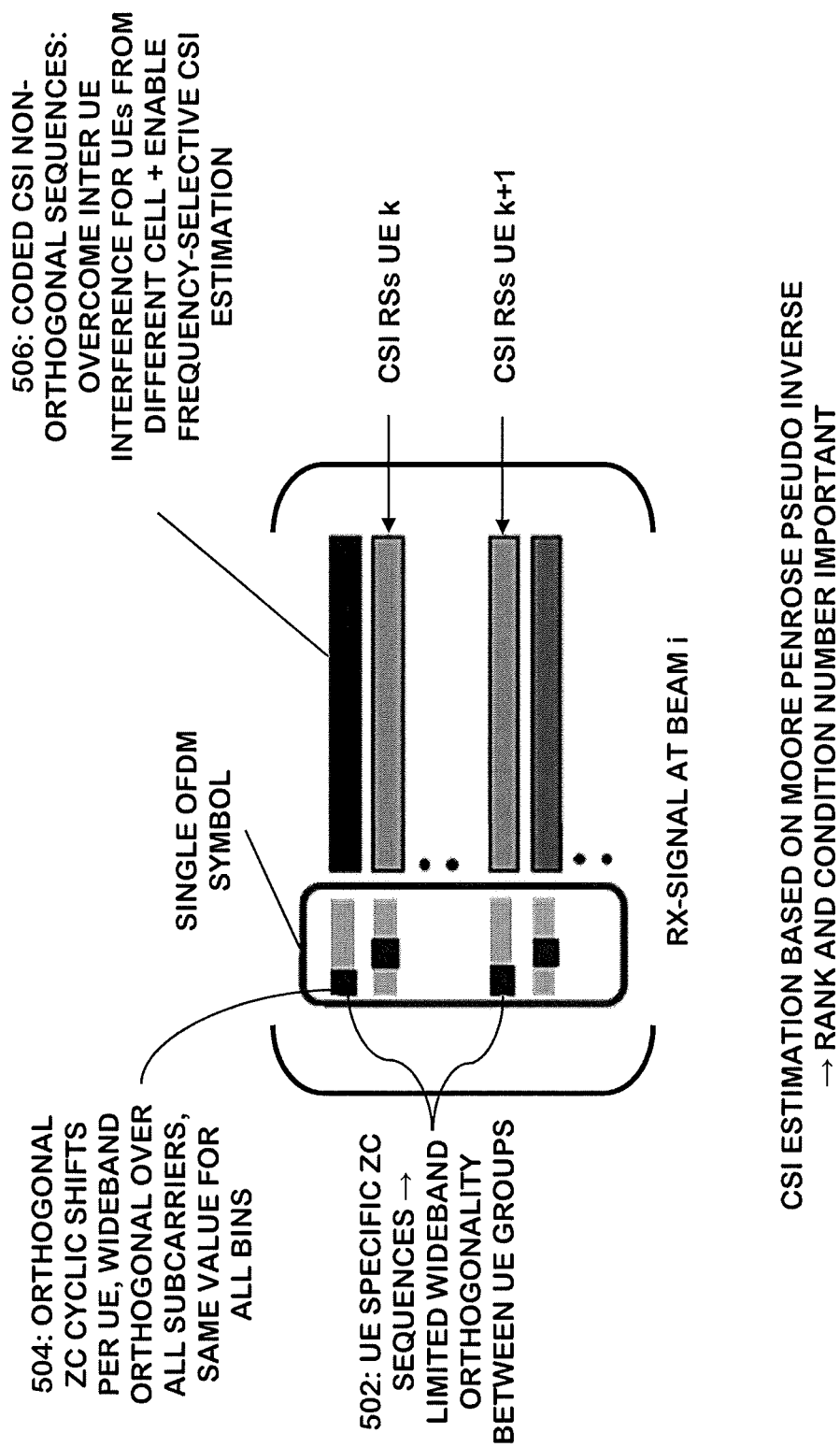
FIG. 5 shows an example SRS allocation in accordance with an example embodiment.

FIG. 5 shows an example of SRS allocation to all UEs in accordance with an example embodiment. In FIG. 5, a certain beam i will receive the sequences { . . . k, k+1, . . . } of the subset of relevant UEs { . . . k, k+1, . . . } for this beam i. The UE-specific ZC sequences 502 are allocated to the full bandwidth of a single OFDM symbol and wideband orthogonality is being achieved using different cyclic shifts per UE as represented by 504. An adjacent cell may then use the same cyclic shifts with a relatively lower inter UE orthogonality between the cells. This can then be enhanced by adding the UE specific non-orthogonal Coded CSI RSs sequences 506. These non-orthogonal sequences may be added per PRB or per frequency subband to enable frequency selective CSI estimation.

Figure 6:
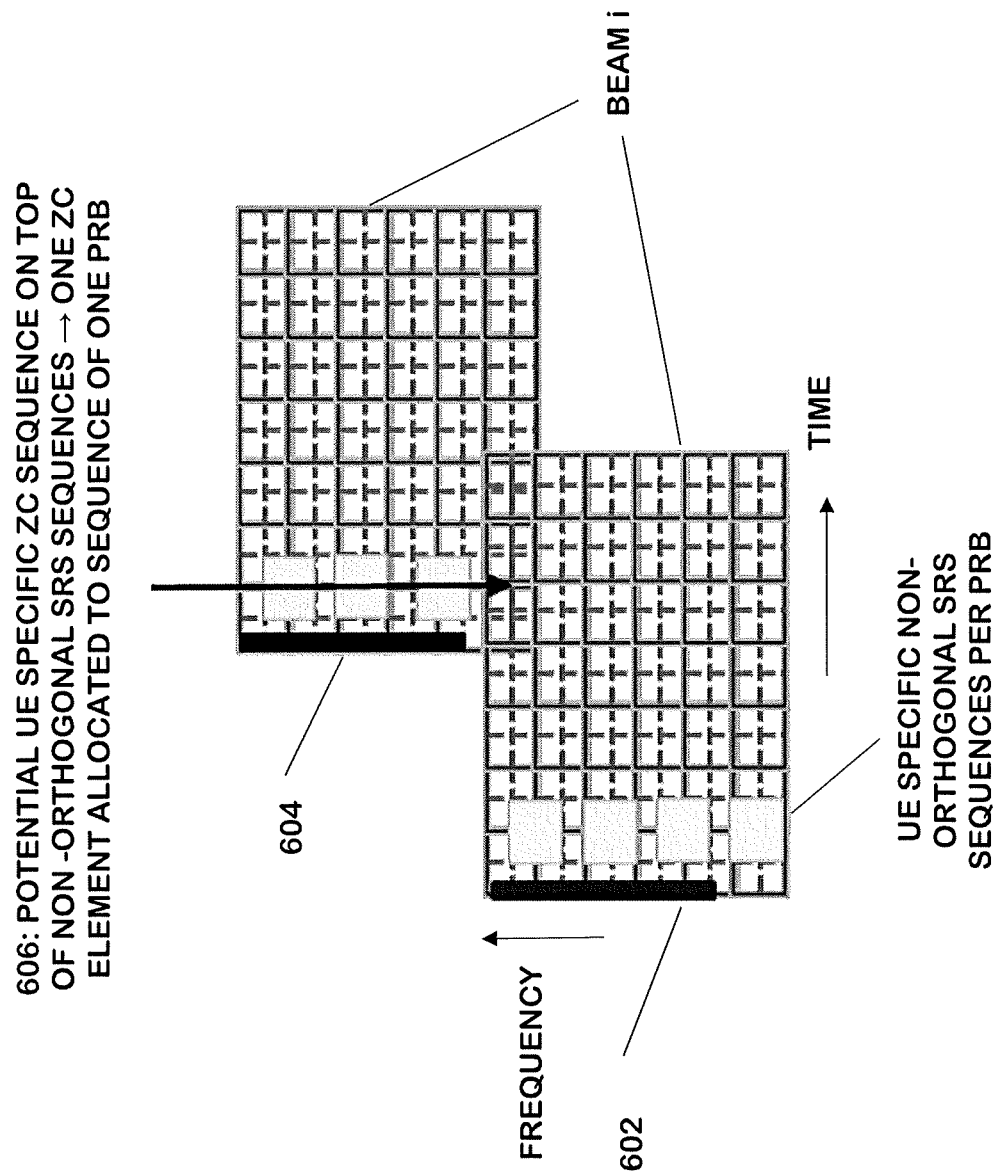
FIG. 6 shows another example SRS allocation in accordance with and example embodiment.

Referring to FIG. 6, this figure shows an example of an allocation of SRS sequences in time and frequency for different UEs for beam i. The wideband UE specific ZC sequences 602, 604 that are specific to UE k and UE k+1, respectively, are transmitted during the first OFDM symbol. According to some example embodiments, the non-orthogonal SRS sequences are allocated per PRB and as compactly as possible in time and frequency to minimize inter code crosstalk. In another example embodiment, a UE specific ZC sequence 606 might further run over all the non-orthogonal SRS sequences in such a way that per PRB all SRS sequence elements are multiplied by one element of the ZC sequence.

Alternatively, the ZC sequences may be partly adapted so that a different shorter ZC sequences are used on a few parallel frequency subbands per UE so that they provide at least some frequency selective CSI information and the non-orthogonal sequence extensions may be used to improve the frequency selective CSI estimations per subband.

Another approach is to integrate the references signals from the ZC sequences, i.e., to start each frequency selective Vandermonde like non-orthogonal sequences with one element of the ZC sequence, e.g., the element on the closest subcarrier in a certain PRB.

Due to the assumption that the radio channel in combination with strong Tx- and Rx-beamforming will be sparse, the length of the non-orthogonal Coded SRS sequences may be relatively short. 'Sparse' means here that each beam will receive power only from a limited number of all active UEs. Thus, in some example embodiments, new messages may be defined for the flexible allocation of ZC and non-orthogonal coded SRS reference signals and for the fast adaptation of the sequence length, such as depending on the scheduled UE group for example. This adaptation of the configuration may be done for all UEs simultaneously or for individual UEs via PDCCH messages for example.

In some example embodiments, new RRC, MAC CE and/or DCI messages are introduced for implementing the orthogonal and non-orthogonal SRS part. In some example embodiments, the new RRC messages may also be used to allocate non-orthogonal sequence IDs to UEs. The sequence IDs may be directly coupled to the UE IDs in a predefined manner to minimize the extra control overhead. In general, the allocation of the sequence IDs and the sequence lengths per UE are coordinated over all cells forming the cooperation area.

Figure 7:
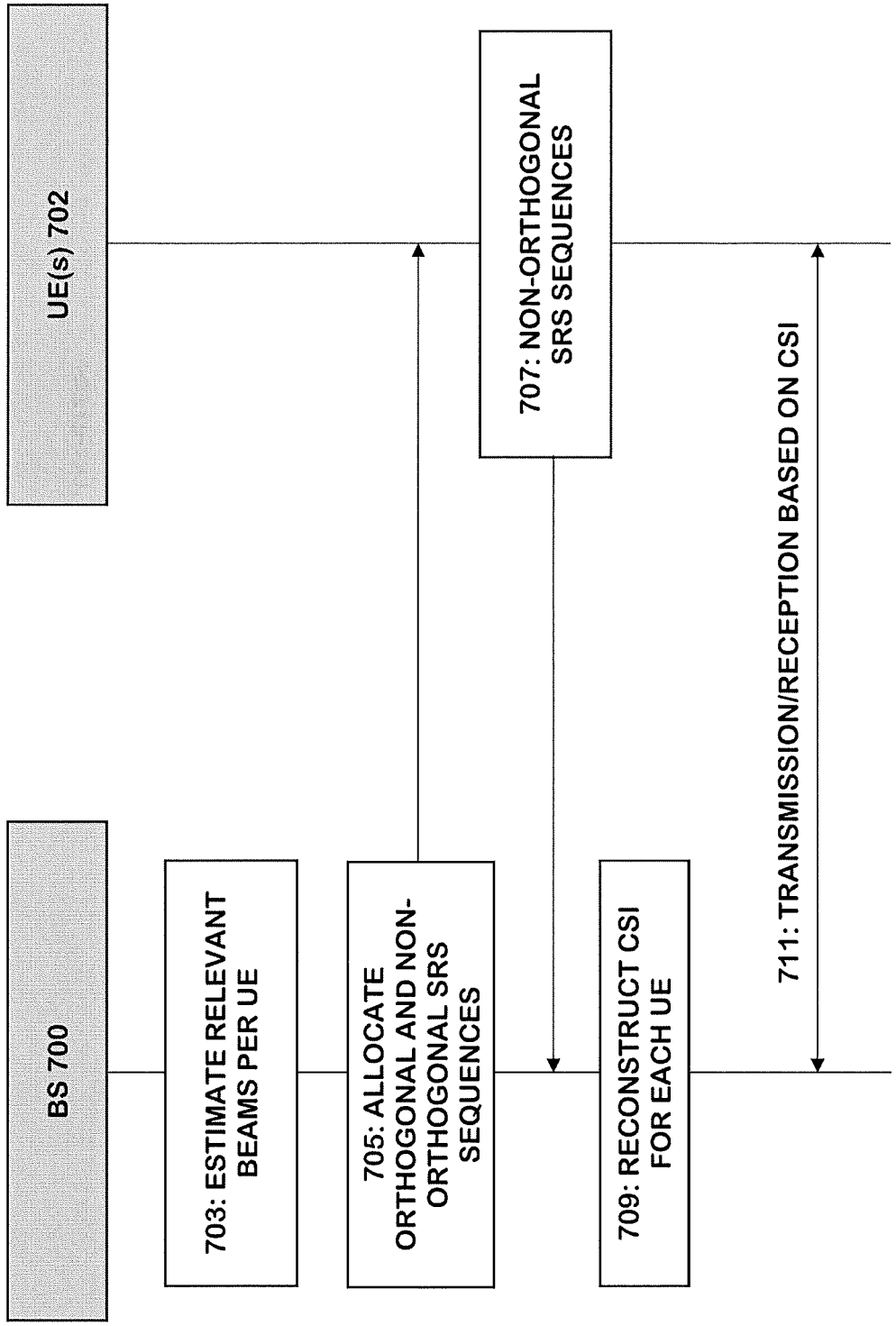
FIG. 7 shows a simplified signaling diagram according in accordance with some example embodiments.

Referring now to FIG. 7, this figure shows a simplified signaling diagram according in accordance with some example embodiments. At 703, the base station (BS) (such as RAN Node 170 for example) may estimate the relevant beams for each user equipment 702 (which may correspond to UE 110 for example). For example, the BS 700 may semi-statically estimate all of the relevant beams for each UE based on RSRP measurements and/or UE reports on PUCCH. The relevant beams may then be stored into memory. At 705 the BS 700 allocates UE-specific non-orthogonal SRS sequences for each UE 702. The UE specific non-orthogonal SRS sequences may be allocated either directly coupled to an identifier of the corresponding UE (i.e. UE ID), or defined for each UE 702 and controlled over a control channel (such as a PDCCH for example). At step 707, all active UEs 702 may then transmit their UE specific non-orthogonal SRS sequences simultaneously. At 709, the BS 700 may then reconstruct the CSI information for each UE 702. For example, the BS 700 may apply the pseudo inverse for the matrix of relevant beam sequences at each Rx-beam to reconstruct the CSI for each UE and relevant beams. This information can then be combined into a sparse estimated channel matrix and used for communication 711 between the base station 700 and UE(s) 702, such as for UL joint reception, DL joint transmission or any other MU MIMO scheme.

According to some example embodiments, the BS 700 may adapt the length of the non-orthogonal sequences for each UE 702, a predefined group of UEs 702, all UEs 702 and/or per TTI or related to the CORESET for a certain group of UEs 702. For example, there may be a group of UEs that comprises cell edge UEs; and another group of UEs that comprises cell center UEs, where these groups are defined by, for example, RSRP measurements. In some examples, the length of the non-orthogonal sequences may be explicitly signaled to a group of UEs, such as via RRC messages for example, or implicitly indicated based on the RSRP reports for example. The sequence length adaptation may be based on MAC CE messages, or possibly, RRC messages. This might be combined with even faster adaptation based on DCI messages, which allows the UE specific sequence length to be adapted per TTI to the set of active UEs. In this case, the MAC CE messages may define a certain user group as well as a set of sequence lengths, and the DCI messages will then select out of the predefined sequence lengths the most appropriate one.

Alternatively, the same sequence length for the non-orthogonal SRS sequence may be used for all UEs, but the sequence elements may be subsampled (such as by setting part of the sequence elements to zero for example). This option supports the combination of different sequences from different UEs with different SINR. For example, one might use subsampled sequences for cell center UEs and additionally boost the power for these subsampled sequences by a certain amount. This way, the base station 700 may in a first step estimate the CSI for the cell center UEs based on a lower dimensioned channel matrix. Then, in a second step, the base station 700 may remove the sub-sampled non-orthogonal sequences from the Rx-signal so that the cell edge UEs with long sequences can be estimated without being affected by the cell center UE sequences. It is noted that in example embodiments that truncate, instead of subsample, the non-orthogonal sequences the rest of the procedure may remain the same.

It is noted that the combination of orthogonal ZC sequences with non-orthogonal extensions allows, for example, UEs to use per cell orthogonal ZC sequences, as currently in NR Release 15 and then to use per cell non-orthogonal cell specific extensions to support multi TRP and/or to effectively overcome pilot contamination from UEs from different cells.

For SC-OFDM the non-orthogonal sequences may be placed f-selective, namely, multiple times in frequency. Doing so allows, for example, more accurate DL precoding or other future advanced system concepts. According to some embodiments, the base station (such as a gNB for example) may determine the density in frequency and sequence length per UE based on the channel conditions as well as other criteria such as load conditions for example. Predefined rules for allocation of Coded CSI sequences to UL resources may be used to minimize the control overhead for this adaptation.

In some example embodiments, one can consider power boosting of non-orthogonal sequences of cell center UEs with low number of relevant channel components. This allows an iterative interference cancellation of the stronger cell center RSs with shorter non-orthogonal sequence length. The decoding of the cell edge UEs can then be done after cancellation of the cell center sequences with higher accuracy.

An alternative to inter code cancellation might be to allocate different REs for cell edge and cell center UEs for example.

Figure 8:
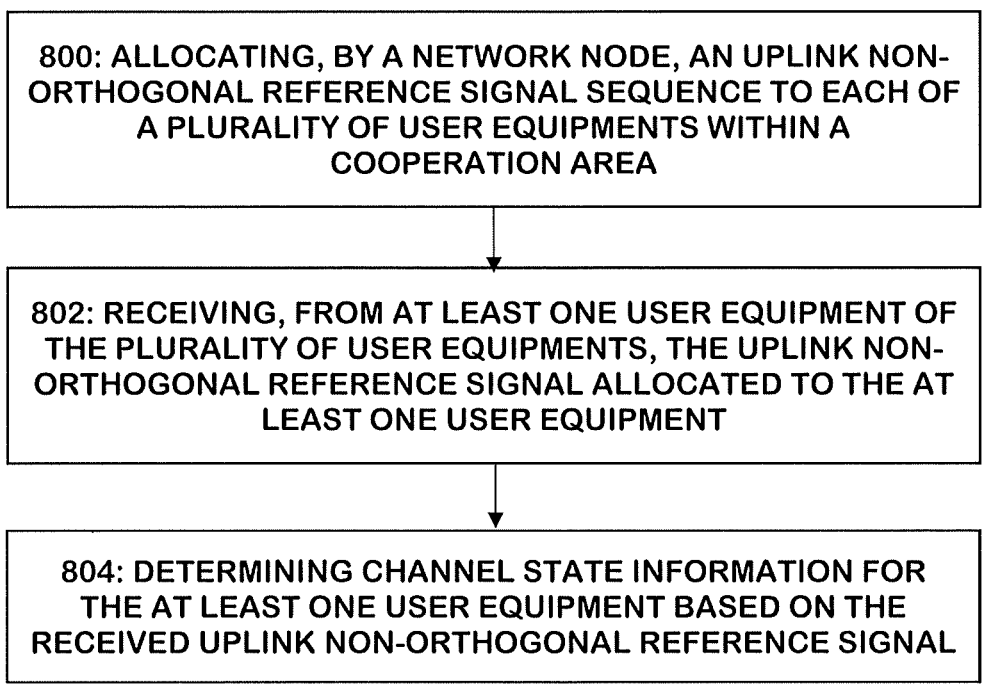
FIGS. 8-9 are logic flow diagrams for an enhanced sounding reference signal scheme, and illustrate the operation of an exemplary method or methods, a result of execution of computer program instructions embodied on a computer readable memory, functions performed by logic implemented in hardware, and/or interconnected means for performing functions in accordance with exemplary embodiments.

FIG. 8 is a logic flow diagram for an enhanced sounding reference signal scheme. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the SRS allocation module 150-1 and/or 150-2 may include multiples ones of the blocks in FIG. 8, where each included block is an interconnected means for performing the function in the block. The blocks in FIG. 8 are assumed to be performed by a base station such as RAN node 170, e.g., under control of the SRS allocation module 150-1 and/or 150-2 at least in part.

According to an example of an embodiment (which may be referred to as example 1), a method is provided including: allocating, by a network node, an uplink non-orthogonal reference signal sequence to each of a plurality of user equipments within a cooperation area as indicated by block 800; receiving, from at least one user equipment of the plurality of user equipments, the uplink non-orthogonal reference signal allocated to the at least one user equipment as indicated by block 802; and determining channel state information for the at least one user equipment based on the received uplink non-orthogonal reference signal as indicated by block 804.

An example of a further embodiment (which may be referred to as example 2), is a method as in example 1, the method further comprising allocating an uplink orthogonal reference signal sequence to each of the plurality of user equipments, wherein the determining of the channel state information for the at least one user equipment is further based on the received uplink non-orthogonal reference signal.

An example of a further embodiment (which may be referred to as example 3), is a method as in any one of examples 1-2, wherein the allocating of the uplink non-orthogonal reference signal sequence to each of the plurality of user equipments comprises: allocating a first uplink non-orthogonal reference signal sequence to a first user equipment of the user equipments and a second non-orthogonal reference signal sequence to a second user equipment of the user equipments, wherein a length of the first uplink non-orthogonal reference signal sequence is different than a length of the second uplink non-orthogonal reference signal sequence.

An example of a further embodiment (which may be referred to as example 4), is a method as in example 3, wherein the length of the first uplink non-orthogonal reference signal sequence is different than a length of the second uplink non-orthogonal reference signal sequence due to at least one of: truncating the first uplink non-orthogonal reference signal sequence and/or the second uplink non-orthogonal reference signal sequence; and subsampling the first uplink non-orthogonal reference signal sequence and/or the second uplink non-orthogonal reference signal sequence.

An example of a further embodiment (which may be referred to as example 5), is a method as in any one of examples 3-4, wherein the first user equipment is located closer to the network node than the second user equipment.

An example of a further embodiment (which may be referred to as example 6), is a method as in any one of examples 1-5, wherein the allocating of the uplink non-orthogonal reference signal sequence to each of the plurality of user equipments within the cooperation area comprises: allocating sequence elements of each respective uplink non-orthogonal reference signal sequence to resource elements so as to minimize inter-code crosstalk.

An example of a further embodiment (which may be referred to as example 7), is a method as in example 6, wherein allocating the sequence elements of each respective uplink non-orthogonal reference signal sequence is based at least on positions of the sequence elements within the respective uplink non-orthogonal reference signal sequences.

An example of a further embodiment (which may be referred to as example 8), is a method as in any one of examples 1-7, wherein each of the uplink non-orthogonal reference signal sequences is associated with a sequence identifier corresponding to the cooperation area, and where the allocating of the uplink non-orthogonal reference signal sequence to each of the plurality of user equipments within the cooperation area comprises at least one of: allocating the uplink non-orthogonal reference signal sequences based on the sequence identifiers and user identifiers of the plurality of user equipment; and transmitting respective control channel messages to the plurality of user equipments, wherein each of the respective control channel messages is indicative of a length of the uplink non-orthogonal reference signal sequence for the corresponding user equipment.

An example of a further embodiment (which may be referred to as example 9), is a method as in any one of examples 1-8, wherein the uplink non-orthogonal reference signal is received from the at least one user equipment on one or more receive beams associated with the network node, and wherein the determining of the channel state information comprises reconstructing the channel state information for each the at least one user equipment from the one or more receive beams.

In an example embodiment, an apparatus is provided (which may be referred to as example 10) including: means for allocating, by a network node, an uplink non-orthogonal reference signal sequence to each of a plurality of user equipments within a cooperation area; means for receiving, from at least one user equipment of the plurality of user equipments, the uplink non-orthogonal reference signal allocated to the at least one user equipment; and means for determining channel state information for the at least one user equipment based on the received uplink non-orthogonal reference signal.

An example of a further embodiment (which may be referred to as example 11), is an apparatus as in example 10, further comprising means for performing a method as in any one of examples 2-9.

An example of a further embodiment (which may be referred to as example 12), is a computer readable medium comprising program instructions for causing an apparatus to perform at least the following: allocating, by a network node, an uplink non-orthogonal reference signal sequence to each of a plurality of user equipments within a cooperation area; receiving, from at least one user equipment of the plurality of user equipments, the uplink non-orthogonal reference signal allocated to the at least one user equipment; and determining channel state information for the at least one user equipment based on the received uplink non-orthogonal reference signal.

An example of a further embodiment (which may be referred to as example 13), is a computer readable medium as in example 12, wherein the program instructions further cause the apparatus to perform a method as in any one of examples 2-9.

In an example embodiment (which may be referred to as example 14), an apparatus is provided comprising: at least one processor; and at least one non-transitory memory including computer program code, the at least one memory and the computer program code configured to, with the at least one processor, cause the apparatus to perform at least: allocating, by a network node, an uplink non-orthogonal reference signal sequence to each of a plurality of user equipments within a cooperation area; receiving, from at least one user equipment of the plurality of user equipments, the uplink non-orthogonal reference signal allocated to the at least one user equipment; and determining channel state information for the at least one user equipment based on the received uplink non-orthogonal reference signal.

An example of a further embodiment (which may be referred to as example 15), is a computer readable medium as in example 14, wherein the program instructions further cause the apparatus to perform a method as in any one of examples 2-9.

Figure 9:
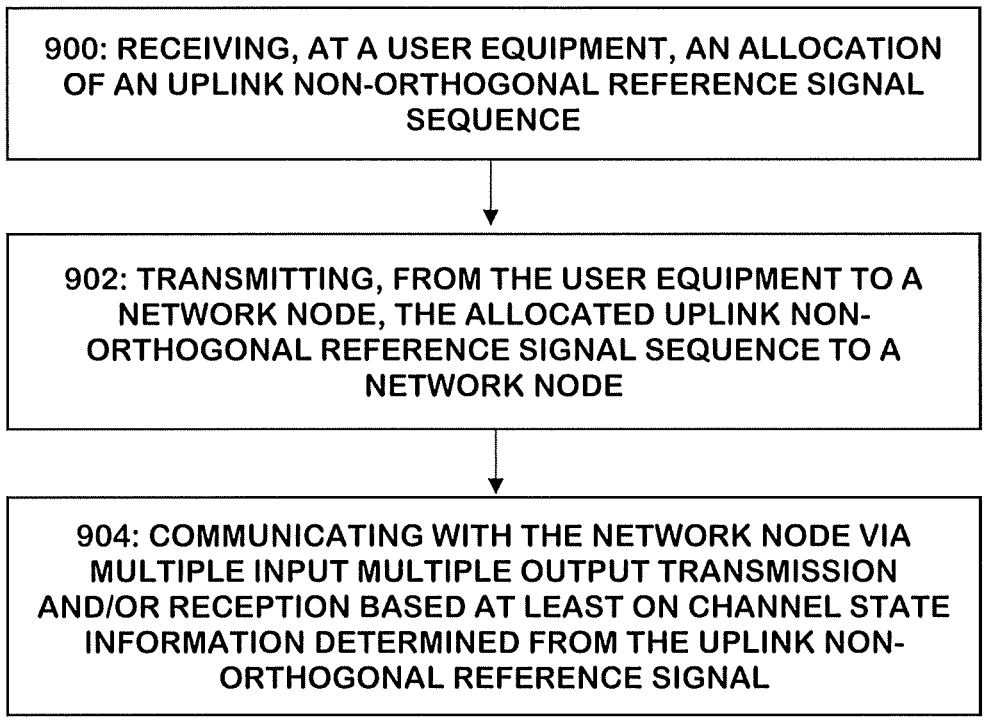

FIG. 9 is a logic flow diagram for an enhanced sounding reference signal scheme. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the enhanced SRS module 140-1 and/or 140-2 may include multiples ones of the blocks in FIG. 9, where each included block is an interconnected means for performing the function in the block. The blocks in FIG. 9 are assumed to be performed by the UE 110, e.g., under control of the enhanced SRS module 140-1 and/or 140-2 at least in part.

According to an example of an embodiment (which may be referred to as example 16), a method is provided including: receiving, at a user equipment, an allocation of an uplink non-orthogonal reference signal sequence as indicated by block 900; transmitting, from the user equipment to a network node, the allocated uplink non-orthogonal reference signal sequence to a network node as indicated by block 902; and communicating with the network node via multiple input multiple output transmission and/or reception based at least on channel state information determined from the uplink non-orthogonal reference signal as indicated by block 904.

An example of a further embodiment (which may be referred to as example 17), is a method as in example 16, the method further comprising receiving an allocation of an uplink orthogonal reference signal sequence, wherein the channel state information is determined further from the uplink non-orthogonal reference signal.

An example of a further embodiment (which may be referred to as example 18), is a method as in any one of examples 16-17, wherein a length of the uplink non-orthogonal reference signal sequence variable.

An example of a further embodiment (which may be referred to as example 19), is a method as in example 18, the method further comprising determining the length of the uplink non-orthogonal reference signal sequence based on at least one of: a reference signal received quality; and an explicit indication from the network node.

An example of a further embodiment (which may be referred to as example 20), is a method as in example 19, wherein the explicit indication is signaled via a radio resource control message.

An example of a further embodiment (which may be referred to as example 21), is a method as in any one of examples 18-20, wherein the length of the uplink non-orthogonal reference signal sequence is based at least on a location of the user equipment within a cell of the network node.

An example of a further embodiment (which may be referred to as example 22), is a method as in any one of examples 18-21, wherein the length of the uplink non-orthogonal reference signal sequence is based on: truncation of the uplink non-orthogonal reference signal sequence; and subsampling of the uplink non-orthogonal reference signal sequence.

An example of a further embodiment (which may be referred to as example 23), is a method as in any one of examples 16-22, wherein sequence elements of the uplink non-orthogonal reference signal sequence are allocated to resource elements so as to minimize inter-code crosstalk.

An example of a further embodiment (which may be referred to as example 24), is a method as in example 23, wherein the sequence elements of the uplink non-orthogonal reference signal sequence is allocated based at least on positions of the sequence elements within the uplink non-orthogonal reference signal sequence.

An example of a further embodiment (which may be referred to as example 25), is a method as in any one of examples 16-24, wherein the uplink non-orthogonal reference signal sequences is associated with a sequence identifier corresponding to the cooperation area, and where the uplink non-orthogonal reference signal sequence is allocated based on the sequence identifier and a user identifier of the user equipment.

In an example embodiment, an apparatus is provided (which may be referred to as example 26) including: means for receiving, at a user equipment, an allocation of an uplink non-orthogonal reference signal sequence; means for transmitting, from the user equipment to a network node, the allocated uplink non-orthogonal reference signal sequence to a network node; and means for communicating with the network node via multiple input multiple output transmission and/or reception based at least on channel state information determined from the uplink non-orthogonal reference signal.

An example of a further embodiment (which may be referred to as example 27), is an apparatus as in example 26, further comprising means for performing a method as in any one of examples 17-25.

An example of a further embodiment (which may be referred to as example 28), is a computer readable medium comprising program instructions for causing an apparatus to perform at least the following: receiving, at a user equipment, an allocation of an uplink non-orthogonal reference signal sequence; transmitting, from the user equipment to a network node, the allocated uplink non-orthogonal reference signal sequence to a network node; and communicating with the network node via multiple input multiple output transmission and/or reception based at least on channel state information determined from the uplink non-orthogonal reference signal.

An example of a further embodiment (which may be referred to as example 29), is a computer readable medium as in example 28, wherein the program instructions further cause the apparatus to perform a method as in any one of examples 17-25.

In an example embodiment (which may be referred to as example 30), an apparatus is provided comprising: at least one processor; and at least one non-transitory memory including computer program code, the at least one memory and the computer program code configured to, with the at least one processor, cause the apparatus to perform at least: receiving, at a user equipment, an allocation of an uplink non-orthogonal reference signal sequence; transmitting, from the user equipment to a network node, the allocated uplink non-orthogonal reference signal sequence to a network node; and communicating with the network node via multiple input multiple output transmission and/or reception based at least on channel state information determined from the uplink non-orthogonal reference signal.

An example of a further embodiment (which may be referred to as example 31), is a computer readable medium as in example 30, wherein the program instructions further cause the apparatus to perform a method as in any one of examples 17-25.

Without in any way limiting the scope, interpretation, or application of the claims appearing below, a technical effect of one or more of the example embodiments disclosed herein is allowing low to moderate overhead for SRS compared to a fully orthogonal extension, even in case of multi TRP solutions like JR or JT COMP over, e.g., nine cells with many simultaneously active UEs. For example, for 10 active UEs per nine cells we would otherwise need overall 90 orthogonal SRS resources, and that per PRB in case of f-selective CSI estimation.

Another technical effect of one or more of the example embodiments disclosed herein is, in case of conventional single cell operation, as opposed to JR or JT CoMP, there is reduced inter cell interference of UL SRS transmissions from different cells with moderate extra overhead.

Another technical effect of one or more of the example embodiments disclosed herein is, achieving (more) frequency selective CSI information, mainly due to the higher efficiency of Coded SRS RSs as the sequence lengths may be scaled with the number of received UEs per beam instead of the overall number of UEs.

Another technical effect of one or more of the example embodiments disclosed herein is that the combination with NR Release 15 ZC sequences allows to combine Release 15 UEs together with the more advanced UEs that already support non-orthogonal SRS, and also provides a simple fall back mode, such as for low load conditions for example. In a more sophisticated application, the average channel estimates based on NR Release 15 ZC sequences may be integrated into the code matrix C, comprising the non-orthogonal SRS sequences, which will improve the condition number of C and the estimation quality after the Moore Penrose pseudo inversion operation.

Another technical effect of one or more of the example embodiments disclosed herein is, that the number of required resource elements relates to the maximum number of UEs being received at a certain beam instead of the higher number of active UEs in the cooperation area.

Another technical effect of one or more of the example embodiments disclosed herein is, overcoming pilot contamination, which will be especially effective in combination with IF floor shaping.

Another technical effect of one or more of the example embodiments disclosed herein is, allowing flexible SRS bandwidth per UE. Typically, the orthogonality of SRS based on ZC sequences depends on the relative active bandwidth of the ZC sequences, and there will be a degradation in case the lengths of the ZC sequences do not fit from two interfering UEs from two adjacent cells.

Another technical effect of one or more of the example embodiments disclosed herein is, minimizes the power consumption as well as resource usage whenever possible by subsampling and/or truncation of the non-orthogonal sequences for cell center UEs. Similarly, an adaptation of the frequency bin spacing for non-orthogonal sequences has a likewise effect.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
allocating, with a network node, an uplink non-orthogonal reference signal sequence to each of a plurality of user equipments within a cooperation area, wherein sequence elements of each respective uplink non-orthogonal reference signal sequence are allocated to resource elements so as to reduce inter-code crosstalk, the elements at the beginning of the non-orthogonal sequences being placed at resource elements that are farther away in time and frequency while the last elements of the non-orthogonal sequences are allocated at resources elements as close as possible in time and frequency;
receiving, from at least one user equipment of the plurality of user equipments, the uplink non-orthogonal reference signal allocated to the at least one user equipment; and
determining channel state information for the at least one user equipment based on the received uplink non-orthogonal reference signal.

2. The method as in claim 1, further comprising:
allocating an uplink orthogonal reference signal sequence to each of the plurality of user equipments, wherein the determining of the channel state information for the at least one user equipment is further based on the received uplink non-orthogonal reference signal.

3. The method as in claim 1, wherein the allocating of the uplink non-orthogonal reference signal sequence to each of the plurality of user equipments comprises:
allocating a first uplink non-orthogonal reference signal sequence to a first user equipment of the user equipments and a second non-orthogonal reference signal sequence to a second user equipment of the user equipments, wherein a length of the first uplink non-orthogonal reference signal sequence is different than a length of the second uplink non-orthogonal reference signal sequence.

4. The method as in claim 3, wherein the length of the first uplink non-orthogonal reference signal sequence is different than a length of the second uplink non-orthogonal reference signal sequence due to at least one of:
truncating the first uplink non-orthogonal reference signal sequence and/or the second uplink non-orthogonal reference signal sequence; or subsampling the first uplink non-orthogonal reference signal sequence and/or the second uplink non-orthogonal reference signal sequence.

5. The method as in claim 3, wherein the first user equipment is located closer to the network node than the second user equipment.

6. The method as in claim 1, wherein allocating the sequence elements of each respective uplink non-orthogonal reference signal sequence is based at least on positions of the sequence elements within the respective uplink non-orthogonal reference signal sequences.

7. The method as in 6, wherein each of the uplink non-orthogonal reference signal sequences is associated with a sequence identifier corresponding to the cooperation area, and where the allocating of the uplink non-orthogonal reference signal sequence to each of the plurality of user equipments within the cooperation area comprises at least one of:
  allocating the uplink non-orthogonal reference signal sequences based on the sequence identifiers and user identifiers of the plurality of user equipment; or
  transmitting respective control channel messages to the plurality of user equipments, wherein each of the respective control channel messages is indicative of a length of the uplink non-orthogonal reference signal sequence for the corresponding user equipment.

8. The method as in claim 1, wherein the uplink non-orthogonal reference signal is received from the at least one user equipment on one or more receive beams associated with the network node, and wherein the determining of the channel state information comprises reconstructing the channel state information for each the at least one user equipment from the one or more receive beams.

9. An apparatus comprising
  at least one processor; and at least one non-transitory memory including computer program code, the at least one memory and the computer program code configured to, with the at least one processor, cause the apparatus to perform at least:
  allocating, with a network node, an uplink non-orthogonal reference signal sequence to each of a plurality of user equipments within a cooperation area, wherein sequence elements of each respective uplink non-orthogonal reference signal sequence are allocated to resource elements so as to reduce inter-code crosstalk, the elements at the beginning of the non-orthogonal sequences being placed at resource elements that are farther away in time and frequency while the last elements of the non-orthogonal sequences are allocated at resources elements as close as possible in time and frequency;
  receiving, from at least one user equipment of the plurality of user equipments, the uplink non-orthogonal reference signal allocated to the at least one user equipment; and
  determining channel state information for the at least one user equipment based on the received uplink non-orthogonal reference signal.

10. The apparatus as in claim 9, wherein the at least one memory and the computer program code are further configured to, with the at least one processor, cause the apparatus to perform:
  allocating an uplink orthogonal reference signal sequence to each of the plurality of user equipments, wherein the determining of the channel state information for the at least one user equipment is further based on the received uplink non-orthogonal reference signal.

11. The apparatus as in claim 9, wherein the allocating of the uplink non-orthogonal reference signal sequence to each of the plurality of user equipments comprises:
  allocating a first uplink non-orthogonal reference signal sequence to a first user equipment of the user equipments and a second non-orthogonal reference signal sequence to a second user equipment of the user equipments, wherein a length of the first uplink non-orthogonal reference signal sequence is different than a length of the second uplink non-orthogonal reference signal sequence.

12. The apparatus as in claim 11, wherein the length of the first uplink non-orthogonal reference signal sequence is different than a length of the second uplink non-orthogonal reference signal sequence due to at least one of:
  truncating the first uplink non-orthogonal reference signal sequence and/or the second uplink non-orthogonal reference signal sequence; or
  subsampling the first uplink non-orthogonal reference signal sequence and/or the second uplink non-orthogonal reference signal sequence.

13. The apparatus as in claim 11, wherein the first user equipment is located closer to the network node than the second user equipment.

14. The apparatus as in claim 9, wherein the allocating of the sequence elements of each respective uplink non-orthogonal reference signal sequence is based at least on positions of the sequence elements within the respective uplink non-orthogonal reference signal sequences.

15. The apparatus as in claim 9, wherein each of the uplink non-orthogonal reference signal sequences is associated with a sequence identifier corresponding to the cooperation area, and where the allocating of the uplink non-orthogonal reference signal sequence to each of the plurality of user equipments within the cooperation area comprises at least one of:
  allocating the uplink non-orthogonal reference signal sequences based on the sequence identifiers and user identifiers of the plurality of user equipment; or
  transmitting respective control channel messages to the plurality of user equipments, wherein each of the respective control channel messages is indicative of a length of the uplink non-orthogonal reference signal sequence for the corresponding user equipment.

16. The apparatus as in claim 9, wherein the uplink non-orthogonal reference signal is received from the at least one user equipment on one or more receive beams associated with the network node, and wherein the determining of the channel state information comprises reconstructing the channel state information for each the at least one user equipment from the one or more receive beams.

17. A non-transitory computer readable medium comprising program instructions executable by a processor to perform at least the following for an apparatus:
  allocating, with a network node, an uplink non-orthogonal reference signal sequence to each of a plurality of user equipments within a cooperation area, wherein sequence elements of each respective uplink non-orthogonal reference signal sequence are allocated to resource elements so as to reduce inter-code crosstalk, the elements at the beginning of the non-orthogonal sequences being placed at resource elements that are farther away in time and frequency while the last elements of the non-orthogonal sequences are allocated at resources elements as close as possible in time and frequency;

receiving, from at least one user equipment of the plurality of user equipments, the uplink non-orthogonal reference signal allocated to the at least one user equipment; and determining channel state information for the at least one user equipment based on the received uplink non-orthogonal reference signal.

18. The non-transitory computer readable medium as in claim 17, wherein the program instructions executable by the processor further perform for the apparatus:

allocating an uplink orthogonal reference signal sequence to each of the plurality of user equipments, wherein the determining of the channel state information for the at least one user equipment is further based on the received uplink non-orthogonal reference signal.

\* \* \* \* \*